(12) United States Patent
Pangasa

(10) Patent No.: US 9,535,601 B2
(45) Date of Patent: Jan. 3, 2017

(54) METHOD AND APPARATUS FOR GESTURE BASED TEXT STYLING

(71) Applicant: Adobe Systems Incorporated, San Jose, CA (US)

(72) Inventor: Ankit Pangasa, Rohini (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 161 days.

(21) Appl. No.: 13/925,084

(22) Filed: Jun. 24, 2013

(65) Prior Publication Data

US 2014/0380248 A1    Dec. 25, 2014

(51) Int. Cl.
*G06F 3/01*    (2006.01)
*G06F 3/0488*    (2013.01)
*G06F 17/21*    (2006.01)
*G06F 17/24*    (2006.01)

(52) U.S. Cl.
CPC ......... *G06F 3/04883* (2013.01); *G06F 17/211* (2013.01); *G06F 17/24* (2013.01); *G06F 2203/04806* (2013.01); *G06F 2203/04808* (2013.01)

(58) Field of Classification Search
CPC .... G06F 3/0488; G06F 3/04842; G06F 17/24; G06F 3/0484; G06F 3/017; G06F 2203/04806; G06F 2203/04808
See application file for complete search history.

(56) References Cited

U.S. PATENT DOCUMENTS

| | | | |
|---|---|---|---|
| 2008/0168404 A1* | 7/2008 | Ording | 715/863 |
| 2011/0239110 A1* | 9/2011 | Garrett et al. | 715/256 |
| 2012/0192093 A1* | 7/2012 | Migos et al. | 715/773 |
| 2012/0293427 A1* | 11/2012 | Mukai et al. | 345/173 |
| 2012/0306772 A1* | 12/2012 | Tan et al. | 345/173 |
| 2012/0327003 A1* | 12/2012 | Matsumura | 345/173 |
| 2013/0188875 A1* | 7/2013 | Sesum | G06F 17/211 382/198 |
| 2014/0173484 A1* | 6/2014 | Hicks | G06F 3/0486 715/769 |

* cited by examiner

*Primary Examiner* — Lixi C Simpson
(74) *Attorney, Agent, or Firm* — Keller Jolley Preece

(57) ABSTRACT

A method and apparatus for gesture based text styling on a touch screen display is disclosed. The method comprises determining a gesture of a plurality of predefined gestures made on text displayed on a touch screen display, wherein the gesture selectively signifies at least one text style change to the text; and applying the text style change to a least a portion of the displayed text on the touch screen display.

20 Claims, 10 Drawing Sheets

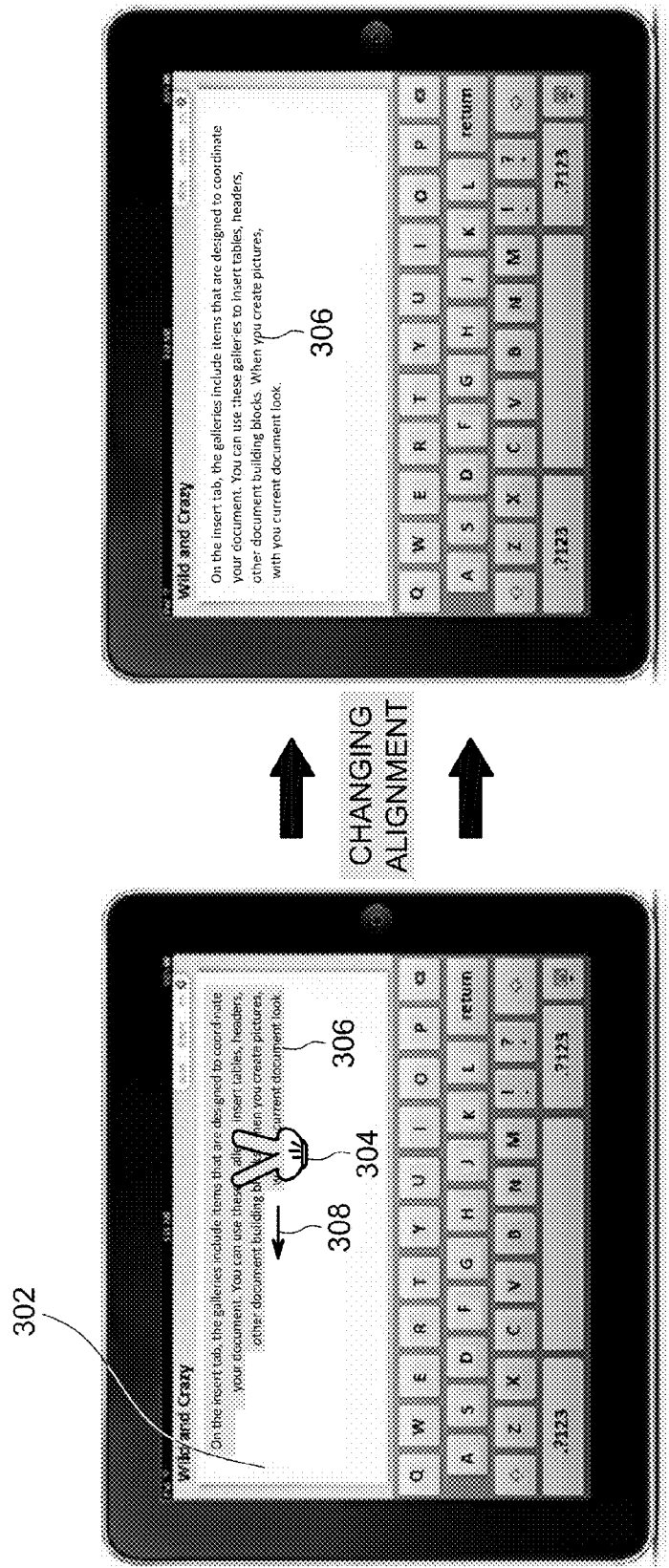

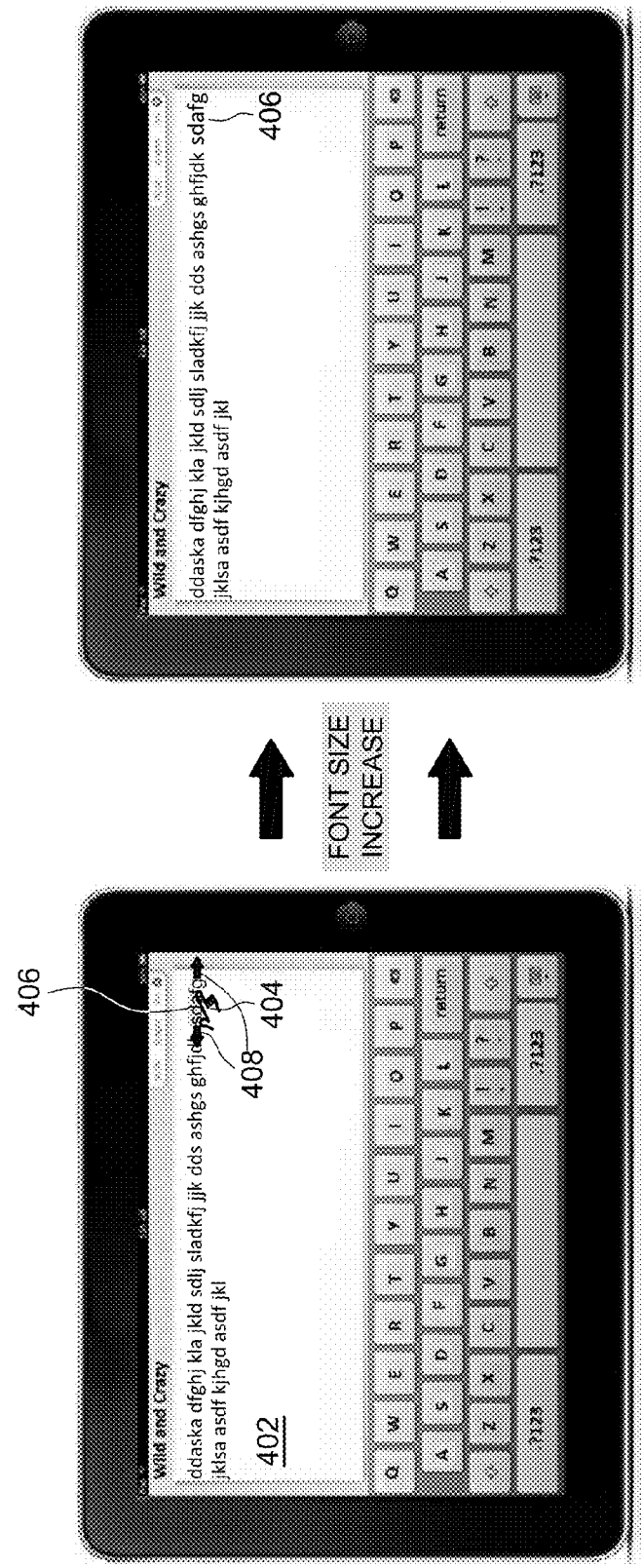

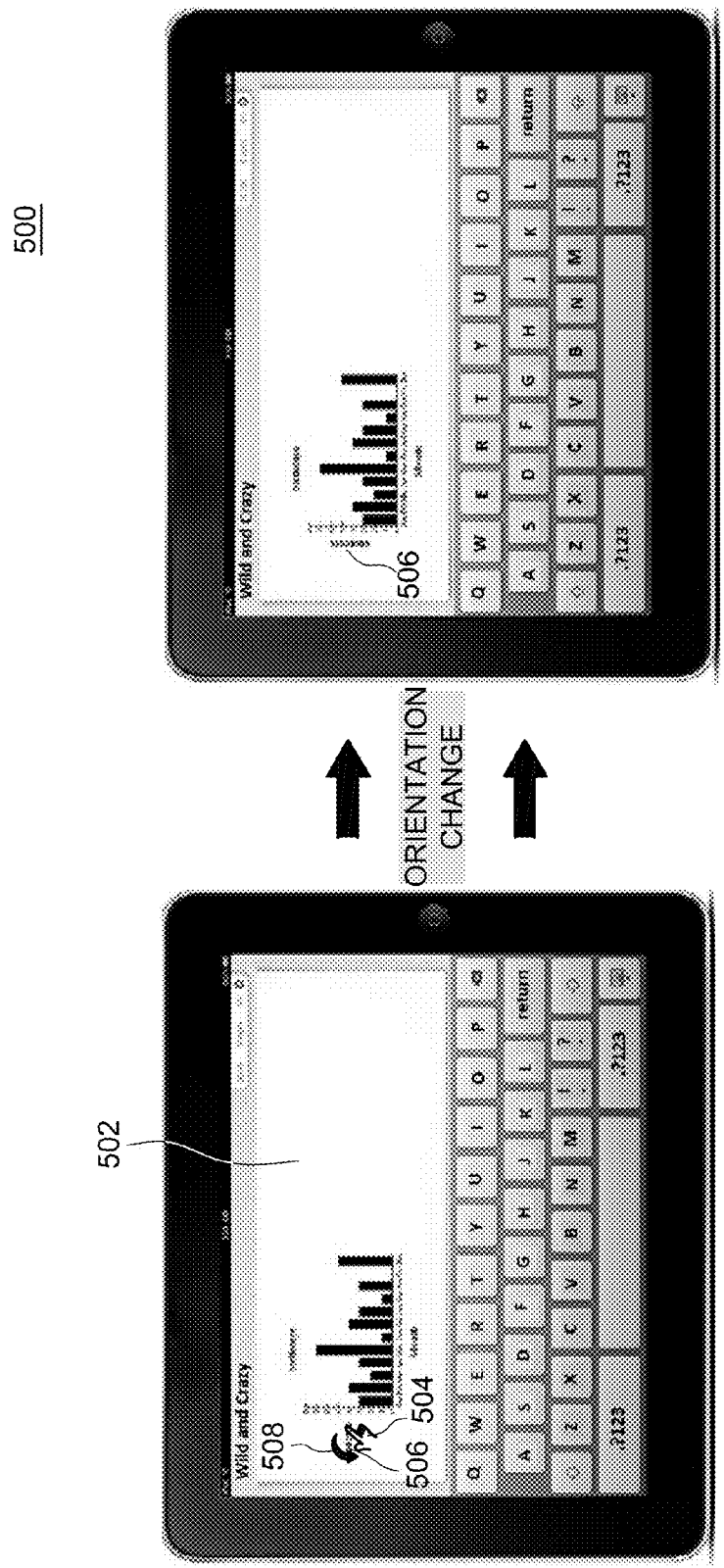

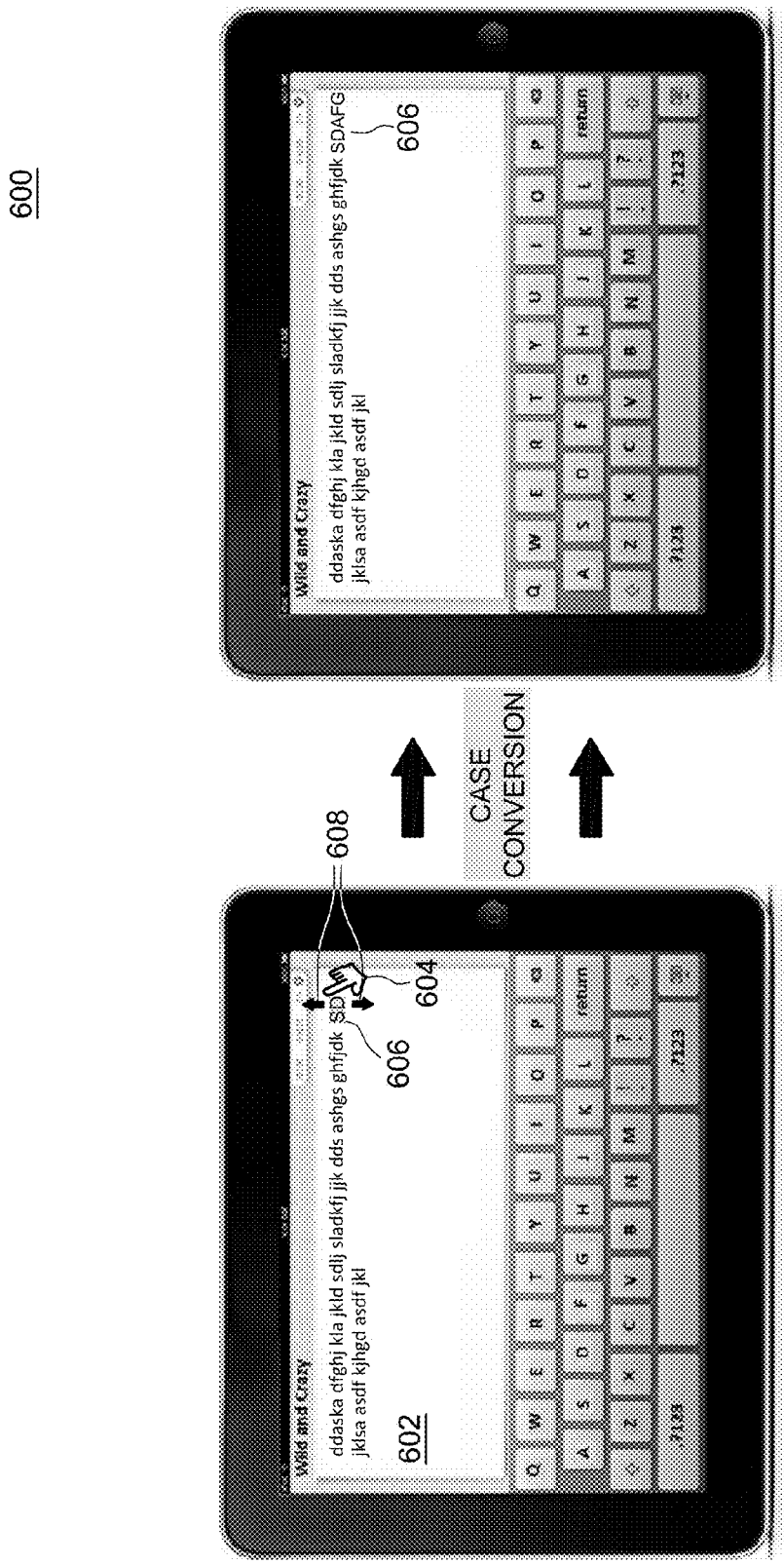

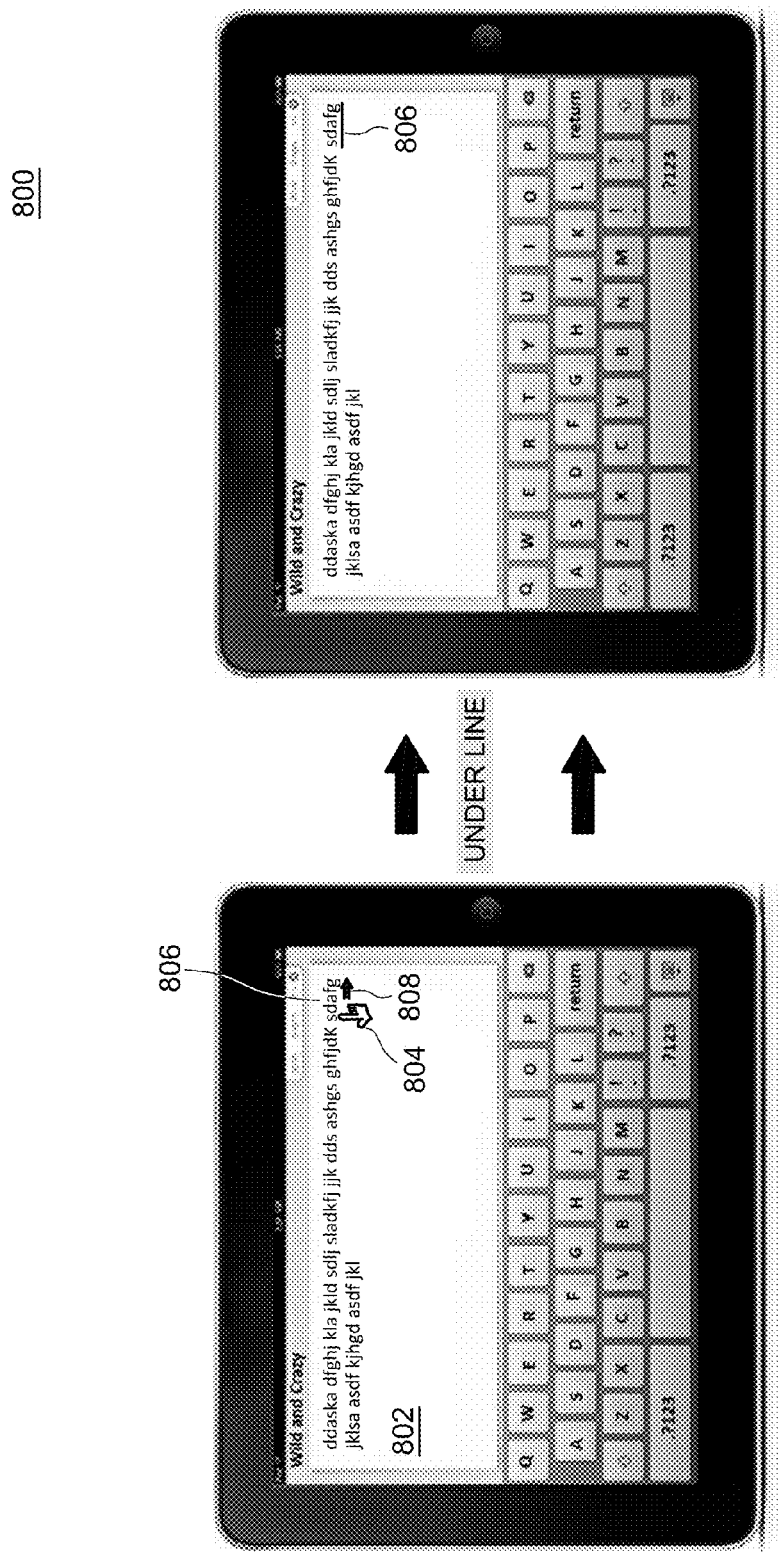

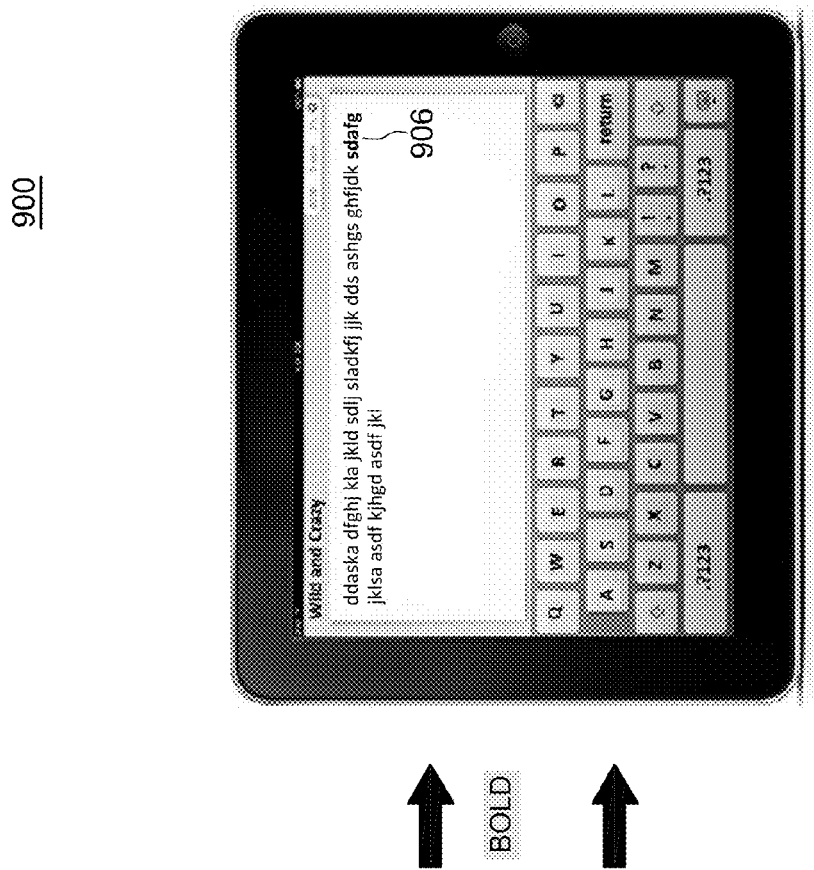
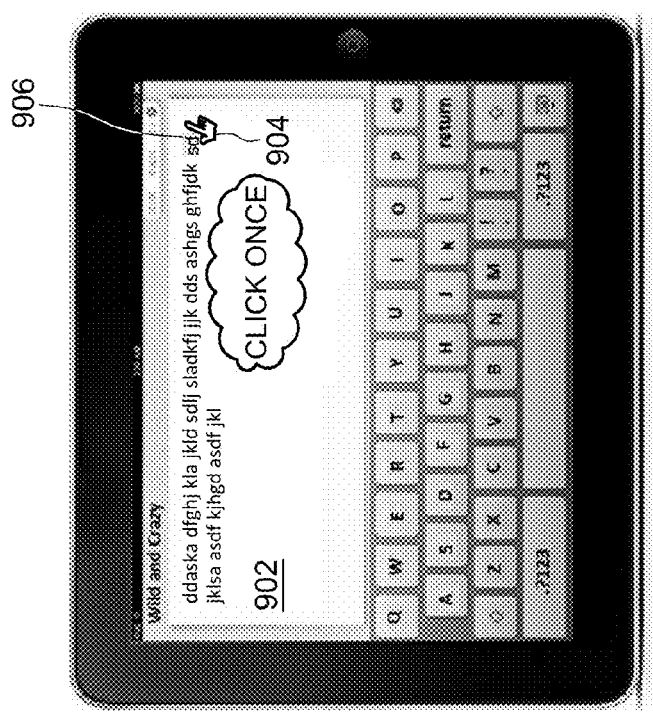
FIG. 9B
FIG. 9A

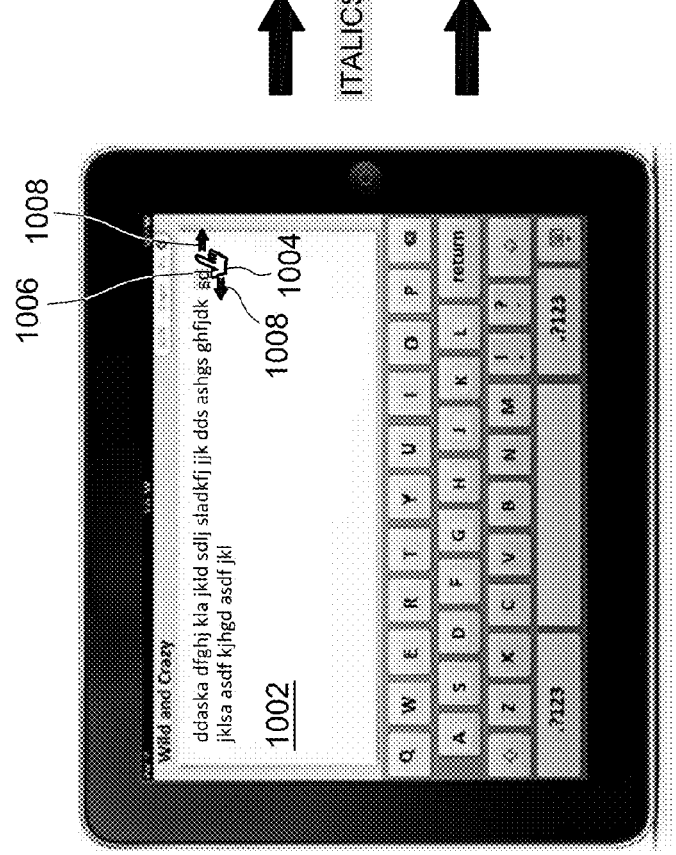
FIG. 10B
FIG. 10A

METHOD AND APPARATUS FOR GESTURE BASED TEXT STYLING

BACKGROUND OF THE INVENTION

Field of the Invention

Embodiments of the present invention generally relate to user interface design and, more particularly, to a method and apparatus for gesture based text styling.

Description of the Related Art

The world is using more compact touch devices to perform many functions that were previously performed on a desktop or laptop computer. For example, people are employing devices such as tablets and smart phones for editing emails, documents, notes, presentations, and other content.

Currently, the text editing experience is poor for compact devices. The small screen size needs to accommodate a complete keyboard, buttons for document editing including text styling, undo/redo, alignment manipulation, bulleting, numbering, font and color settings, and the like. Thus, the user is left with a small text view/edit area. Additionally, the techniques used for text editing can be different for different software applications used to display the text on the touch device. Such software applications may include APPLE® TextEdit, MICROSOFT® Notepad, and device specific applications, such as provided by the ANDROID® Operating System, and the like. As a result, text editing is cumbersome and time consuming for the user.

Therefore, there is a need for a method and apparatus for gesture based text styling.

SUMMARY OF THE INVENTION

A method and apparatus for gesture based text styling substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A and 3B depict an illustration of using a gesture to change the alignment of a paragraph of text, as performed by the application of FIG. 1, according to one or more embodiments;

FIGS. 4A and 4B depict an illustration of using a gesture to increase the font size of text, as performed by the application of FIG. 1, according to one or more embodiments;

FIGS. 5A and 5B depict an illustration of using a gesture to change the orientation of text, as performed by the application of FIG. 1, according to one or more embodiments;

FIGS. 6A and 6B depict an illustration of using a gesture to change the case of text, as performed by the application of FIG. 1, according to one or more embodiments;

FIGS. 8A and 8B depict an illustration of using a gesture to change the text to underline text, as performed by the application of FIG. 1, according to one or more embodiments;

FIGS. 9A and 9B depict an illustration of using a gesture to change text to bold, as performed by the application of FIG. 1, according to one or more embodiments; and FIGS. 10A and 10B depict an illustration of using a gesture to change text to italics, as performed by the application of FIG. 1, according to one or more embodiments.

Figure 1:
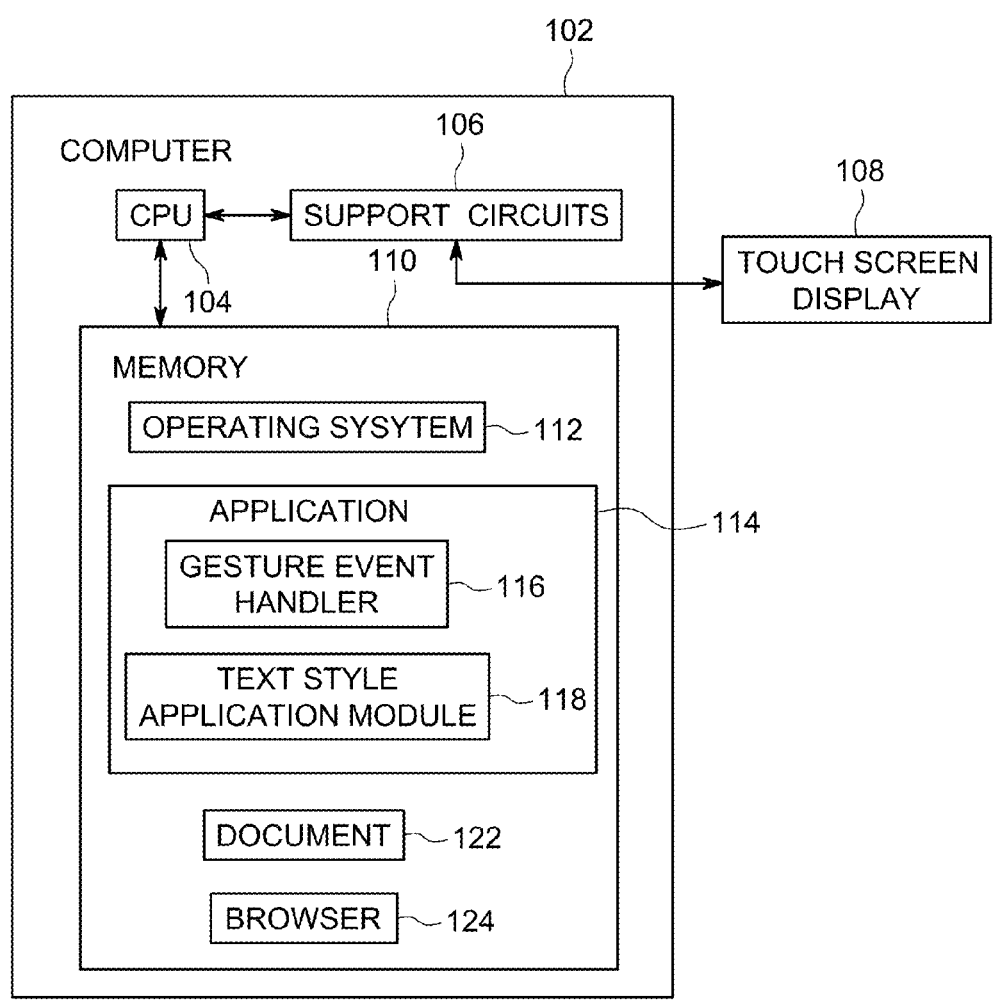
FIG. 1 depicts a block diagram of an apparatus for changing text styles using gestures on a touch device, according to one or more embodiments.

While the method and apparatus is described herein by way of example for several embodiments and illustrative drawings, those skilled in the art will recognize that the method and apparatus for gesture based text styling are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for gesture based text styling as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for gesture based text styling. Text styling includes changing the style of text in a document, such as orientation of the text, case conversion, paragraph alignment, font changes, such as italics or bold, font size, underlining, strikethrough, and the like. Gestures are defined that identify specific changes to the style of the text. For example, a double tap on a word may convert the word to boldface. A gesture of swiping across text may convert the text to strikethrough text. Any number of gestures may be defined that map to specific changes to text style.

When an application is executed that will cause display of editable text on a touch device having a touch screen display, the application registers itself for receiving, from the operating system (OS), notification of touch events on the touch device. When a gesture is received on a user's touch screen, the OS raises an event (acknowledges detection of the event) and sends information (as arguments) with the event such as co-ordinates of the gesture, a number of pointers, an action code, and the like, to the registered application for consumption. The action code is typically whether the action is an action down or action up event. An action down is when a first finger touches the touch screen. An action up is sent when a last finger leaves the touch screen. The number of pointers represents the total number of items (finger, stylus, or other input device) on the touch screen that are involved in initiating the touch event. The application receives the event and extracts the information that the operating system sends with the event. From the extracted information, the embodiments can determine what text style change the user is requesting and then perform the intended action on the selected text.

Advantageously, the present invention may be added to or used in conjunction with any of a plurality of text editing applications that may be executed on touch devices, so as to simplify text editing across multiple applications for users. Such applications may include ADOBE® Collage, ADOBE® CREATIVE SUITE®, ADOBE® ACROBAT® Review and Comment Connector, ADOBE® Debut, ADOBE® Digital Publishing Suite, ADOBE® PHOTOSHOP®, PHOTOSHOP® Elements, PHOTOSHOP® Touch, ACROBAT® Reader, and the like. The present invention provides an improved user experience for text editing on touch devices in that more of the small text view/edit area of the touch device is available and visible to the user, since dedicated text editing buttons will no longer be required to be displayed and take up valuable area on the display screen of the device.

Various embodiments of an apparatus and method for gesture based text styling are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of an apparatus 100 for changing text styles using gestures on a touch device, according to one or more embodiments. The system 100 includes a computer 102 and a touch screen display 108.

The computer 102 is a type of computing device (e.g., a laptop, a desktop, a Personal Digital Assistant (PDA), a tablet, a mobile device, and/or the like) that includes or is attached to a touch screen display 108. The computer 102 includes a CPU 104, support circuits 106, and a memory 110. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, displays, and the like. The memory 110 includes at least one of Read Only Memory (ROM), Random Access Memory (RAM), disk drive storage, optical storage, removable storage and/or the like. The memory 110 includes an operating system 112, an application 114, a document 122, and a browser 124. The application 114 includes a gesture event handler 116 and a text style application module 118.

According to some embodiments of the invention, the operating system 112 generally manages various computer resources (e.g., network resources, file processors, and/or the like). The operating system 112 is configured to execute operations on one or more hardware and/or software modules, such as Network Interface Cards (NICs), hard disks, virtualization layers, firewalls and/or the like. Examples of the operating system 112 may include, but are not limited to, Linux, Mac OSX, BSD, UNIX, Microsoft Windows, ANDROID® OS, and the like. The application 114 calls (accesses) commands associated with the operating system 112 (i.e., native operating system commands) to perform various operations, such as text styling, executing the files and/or the like, as generally performed by software applications, such as ADOBE® Collage, ADOBE® CREATIVE SUITE®, ADOBE® ACROBAT® Review and Comment Connector, ADOBE® Debut, ADOBE® Digital Publishing Suite, ADOBE® PHOTOSHOP®, PHOTOSHOP® Elements, PHOTOSHOP® Touch, and ACROBAT® Reader, available from ADOBE Systems Incorporated, San Jose, Calif.

According to some embodiments, a web page may be viewed within the application 114 using the browser 124. According to some embodiments, the browser 124 is utilized to run and view the document 122 on the touch screen display 108. Examples of browser 124 may include, but are not limited to, FIREFOX®, GOOGLE® CHROME™, INTERNET EXPLORER®, OPERA™, and SAFARI®, ANDROID® browser, FIREFOX® for mobile, INTERNET EXPLORER® Mobile, among others.

The application 114 predefines one or more gestures to map to one or more text styles. According to some embodiments, the application 114 registers itself with the operating system 112 for receiving from the operating system 112 notification of touch events. When a user performs a gesture on a touch device, the operating system 112 raises an event (acknowledges detection of the event) and sends information about the touch event to the registered application for consumption. The information includes coordinates of the gesture, one or more pointers and an action code. The action code is typically whether the action is an "action down" or "action up" event. An action down event is when a first finger touches the screen. An action up event is when the last finger leaves the screen. The number of pointers represents the total number of items (finger, stylus, or other input device) on the touch screen that are involved in initiating the touch event. The application 114 receives the touch information and the gesture event handler 116 extracts the information from the event. Using the coordinate information, the pointer information (i.e., the points of contact on the touch screen), and the action code information, the application 114 determines the text style change the user would like performed on the text at the given coordinates. The text style application module 118 then changes the text style of the text in the document 122 to the text style associated with the gesture.

Figure 2:
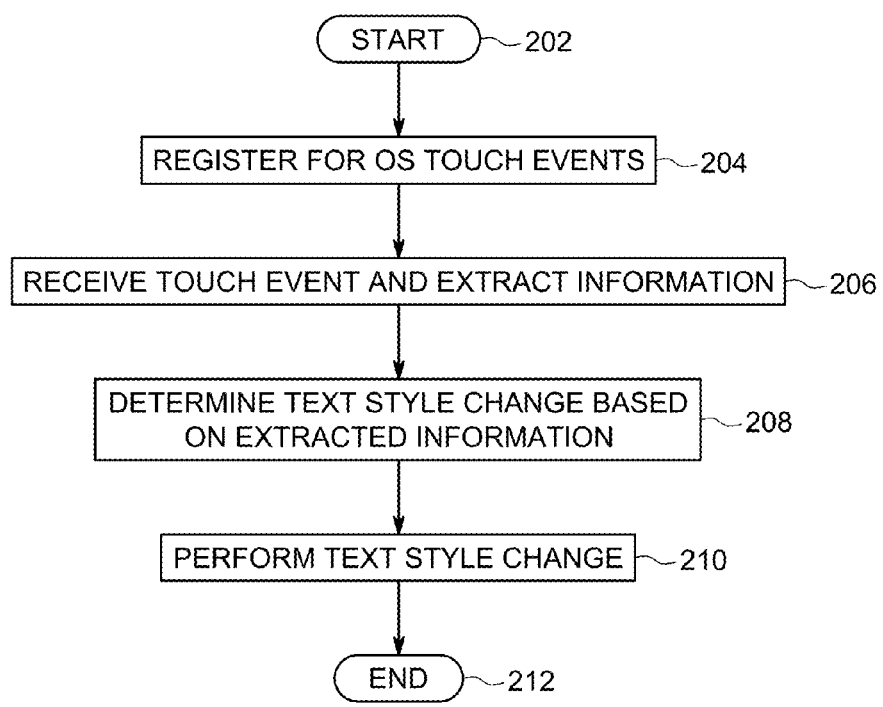
FIG. 2 depicts a flow diagram of a method for applying text style changes based on gestures as performed by the application of FIG. 1, according to one or more embodiments.

FIG. 2 depicts a flow diagram of a method 200 for applying text style changes based on gestures as performed by the application 114 of FIG. 1, according to one or more embodiments. The method 200 includes an operating system that receives from an application a registration to receive touch information with respect to a touch screen display. The method receives one or more touch events detected by the operating system, parses the events to extract information that identifies, based on the gesture, a desired text style change, and then performs the desired text style change on the text in the document.

The method 200 starts at step 202, and proceeds to step 204. At step 204, the method 200 registers itself with an operating system for receiving, from the operating system, notification of touch events performed on a touch device. Every operating system is able to detect and notify the application of the occurrence of one or more events that can help a text editing application monitor actions performed by a user of the touch device. The application can choose which events to receive. An event handler associated with the text editing application is required for handling the received events. The method 200 registers to handle touch events, hereafter referred to as gesture events. When a user performs a gesture on the touch screen, it triggers the operating system to generate an event. The operating system logs (records) information that it receives in accordance with the gesture. Hence, the gesture is an event trigger and the information is used to determine on what text to perform the gesture. Examples of gestures that are performed by a user may include "long touch followed by a slide", "double tap", "click", and the like. Some gestures are two-step gestures and some gestures are one-step gestures. For one-step gestures, the gesture is performed directly on the text. For two-step gestures, the user may need to select the text with a "click" type of gesture and then perform a second gesture to specify the desired action the user would like to have taken on the text. These gestures can be determined by information received in the gesture event. The information includes coordinates, one or more pointers, an action code, and the like. The information is used to determine what text is to be changed and what style change is to be applied to the text. Once the event is generated, the operating system looks for the active event handlers for the generated event (that is, one or more of the applications having text editing capability and which have been registered or otherwise associated with the operating system), and sends the information to the other one or more event handlers as gesture event arguments.

The method 200 proceeds to step 206, where the method 200 receives the gesture event and extracts the information that was sent as gesture event arguments. Based on the event trigger and this information, the method 200 determines whether another gesture is required to complete the text style change or if the text style change can be completed without additional information.

For example, if the event trigger is a "long click followed by a finger slide", the method 200 may determine the text underlying the selected coordinates has been highlighted and waits for a next gesture to determine the text style change that is desired on the highlighted text. If the event trigger is a gesture with pre-selected text (e.g., pre-selected using a "long click followed by a finger slide), the method 200 already has the context of text on which the method 200 needs to perform the action. Using the event arguments (i.e., coordinates and number of pointers), the method 200 can determine the text style change to be performed.

In some embodiments, if the number of pointers is two and the y-coordinate is constant while the x coordinate has changed such that the difference between the initial and final values of both pointers has the same sign, the method 200 determines the action is to change text paragraph alignment, as illustrated in further detail with respect to FIG. 3A below.

In some embodiments, if the number of pointers is two and the x-coordinate has changed such that the difference between the initial and final values of both pointers have different signs, while the y-coordinate is constant, the method 200 determines the action is to change font size, as illustrated in further detail with respect to FIG. 4A below.

In some embodiments, if the number of pointers is two and the initial coordinates and final coordinates are such that they lie on a circumference of a circle, the method 200 determines that the gesture is for rotation of the text. Rotation may be desirable for text on a vertical axis of a graph or chart, as illustrated in further detail with respect to FIG. 5A below.

In some embodiments, if the number of pointers is two and the y-coordinate has changed while the x-coordinate is constant, the method 200 determines that the gesture is a change of case from lower case to upper case, as illustrated in further detail with respect to FIG. 6A below.

In some embodiments, if the gesture is a click and a finger slide without pre-selected text, the method 200 determines the coordinates and evaluates whether the slide is nearly parallel to the x-axis. If the slide is nearly parallel to the x-axis, the method 200 determines whether there is text underlying the slide. If there is text underlying the slide, the gesture is to strikethrough the text, as illustrated in further detail with respect to FIG. 7A below. If the method 200 determines that there is text above the finger slide, within a predefined distance, the method 200 determines that the gesture is to underline the text, as illustrated in further detail with respect to FIG. 8A below.

It is appreciated that although a number of exemplary embodiments are disclosed, other embodiments of the present disclosure envision additional gestures that create other text style changes.

The method 200 proceeds to step 208, where the method 200 performs the text style change determined in step 206 on the selected text. The text change is applied to at least a portion of displayed text. In some embodiments, the text change may be applied to all text, even that text which is not visible on the display. For example, if only a portion of a document is displayed, a gesture of fully-justified may be applied to all of the text of the document, even that test that is not currently visible. The method 200 proceeds to step 210 and ends.

FIGS. 3A and 3B depict an illustration 300 of using a gesture to change the alignment of a paragraph of text, as performed by the application 114 of FIG. 1, according to one or more embodiments. FIG. 3A includes a touch screen 302 and text 306. The text 306 is right-justified. The text 306 is highlighted, meaning that the text 306 has been selected, using, for example, a "long click followed by a finger slide". Once selected, a gesture 304 is performed on the text 306. In this example, two fingers are placed on the text 306 and slid left as illustrated with arrow 308. FIG. 3B illustrates the result of the gesture, specifically, changing the paragraph alignment of text 306 to left-justified.

FIGS. 4A and 4B depict an illustration 400 of using a gesture to increase the font size of text, as performed by the application 114 of FIG. 1, according to one or more embodiments. FIG. 4A includes a touch screen 402 and text 406. The text 406 is highlighted, meaning that the text 406 has been selected, using, for example, a "long click followed by a finger slide". Once selected, a gesture 404 is performed on the text 406. In this example, two fingers are placed on the text 406 and fingers are moved apart as illustrated with arrows 408. FIG. 4B illustrates the result of the gesture, specifically, changing the font size of text 406.

FIGS. 5A and 5B depict an illustration 500 of using a gesture to change the orientation of text, as performed by the application 114 of FIG. 1, according to one or more embodiments. FIG. 5A includes a touch screen 502 and text 506. The text 506 is highlighted, meaning that the text 506 has been selected, using, for example, a "long click followed by a finger slide". Once selected, a gesture 504 is performed on the text 506. In this example, two fingers are placed on the text 506 and fingers are rotated in the direction a user would like to rotate the text, as illustrated with arrow 508. FIG. 5B illustrates the result of the gesture, specifically, changing the orientation of text 506 from horizontal to vertical.

FIGS. 6A and 6B depict an illustration 600 of using a gesture to change the case of text, as performed by the application 114 of FIG. 1, according to one or more embodiments. FIG. 6A includes a touch screen 602 and text 606. The text 606 is highlighted, meaning that the text 606 has been selected, using, for example, a "long click followed by a finger slide". Once selected, a gesture 604 is performed on the text 606. In this example, two fingers are placed on the text 606 and fingers are moved vertically, as illustrated with arrows 608. FIG. 6B illustrates the result of the gesture, specifically, changing the case of text 606 from lower case to upper case.

Figures 7A, 7B:
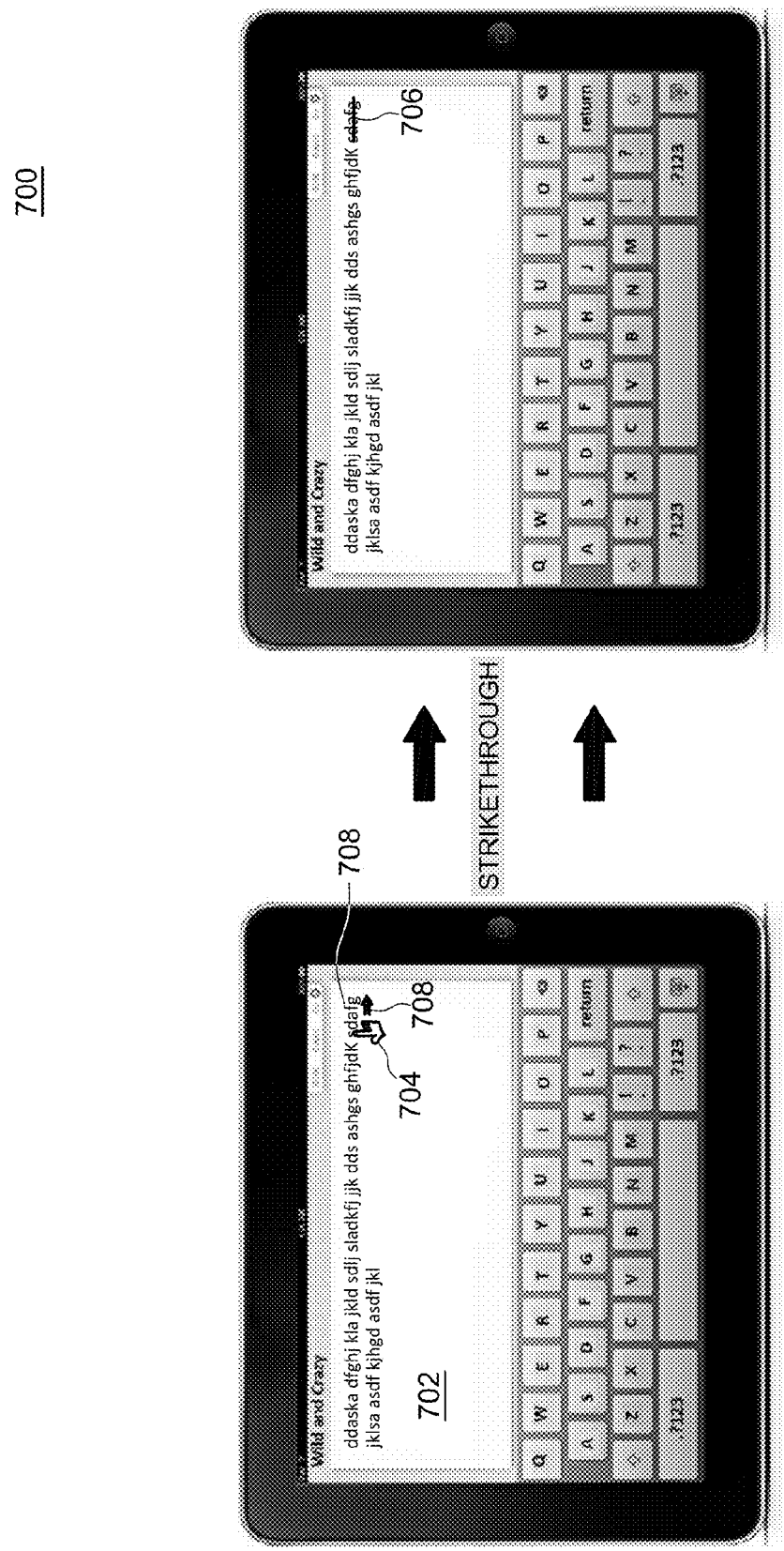
FIGS. 7A and 7B depict an illustration of using a gesture to change the text to strikethrough text, as performed by the application of FIG. 1, according to one or more embodiments.

FIGS. 7A and 7B depict an illustration 700 of using a gesture to change the text to strikethrough text, as performed by the application 114 of FIG. 1, according to one or more embodiments. FIG. 7A includes a touch screen 702 and text 706. A gesture 704 is performed on the text 706. In this example, a finger is placed on the text and swiped across the text 706, as illustrated with arrow 708. FIG. 7B illustrates the result of the gesture, specifically, changing the text 706 to strikethrough text.

FIGS. 8A and 8B depict an illustration 800 of using a gesture to change the text to underlined text, as performed by the application 114 of FIG. 1, according to one or more embodiments. FIG. 8A includes a touch screen 802 and text 806. A gesture 804 is performed on the text 806. In this example, a finger is placed on the text and swiped across the text 806, as illustrated with arrow 808. FIG. 8B illustrates the result of the gesture, specifically, changing the text 806 to underlined text.

FIGS. 9A and 9B depict an illustration 900 of using a gesture to change text to bold, as performed by the application 114 of FIG. 1, according to one or more embodiments. FIG. 9A includes a touch screen 902 and text 906. The text 906 is highlighted, meaning that the text 906 has been selected, using, for example, a "long click followed by a finger slide". Once selected, a gesture 904 is performed on the text 906. In this example, a finger "clicks" on the text. FIG. 9B illustrates the result of the gesture, specifically, changing the text 906 to bold.

FIGS. 10A and 10B depict an illustration 1000 of using a gesture to change text to italics, as performed by the application 114 of FIG. 1, according to one or more embodiments. FIG. 10A includes a touch screen 1002 and text 1006. The text 1006 is highlighted, meaning that the text 1006 has been selected, using, for example, a "long click followed by a finger slide". Once selected, a gesture 1004 is performed on the text 1006. In this example, two fingers are placed on the top and bottom edges of text 1006 and fingers are slid horizontally apart, as illustrated with arrows 1008. FIG. 10B illustrates the result of the gesture, specifically, changing the text 1006 to italics.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for gesture based text styling comprising:
   selecting, by at least one processor, a subset of touch events from a plurality of available touch events to receive from an operating system;
   registering, by the at least one processor, an application having a text editing function with the operating system such that the application having the text editing function receives only the subset of touch events from the plurality of available touch events from the operating system;
   receiving from the operating system an indication of one or more touch events from the subset of touch events with regard to text displayed on a touch screen display, the indication comprising co-ordinates of the one or more touch events, a number of pointers, and an action code;
   upon receipt of the indication of the one or more touch events from the subset of touch events made with regard to the text displayed on the touch screen display, determining, by the application based on the co-ordinates of the one or more touch events, the number of pointers, and the action code, a gesture of a plurality of predefined gestures made with regard to the text displayed on the touch screen display by comparing the co-ordinates of the one or more touch events to a location of the text on the touch screen display;
   identifying a text style change mapped to the determined gesture; and
   applying, by the at least one processor, the text style change to at least a portion of the text displayed on the touch screen display.

2. The method of claim 1, further comprising:
   mapping a unique predefined combination of a total number of items that initiate a given touch event and a given location of the given touch event relative to preselected text to each text style change.

3. The method of claim 2, wherein determining the gesture further comprises determining the gesture of the plurality of predefined gestures made with regard to the text displayed on the touch screen display by comparing the co-ordinates of a touch event of the one or more touch events to the location of the text on the touch screen display and the given location of the given touch event relative to the preselected text.

4. The method of claim 3, wherein
   the gesture is a slide;
   the co-ordinates of the touch event are below the location of the text on the touch screen display;
   the given location is on top of the text; and
   the identified text style change is a strikethrough of the text.

5. The method of claim 3, wherein
   the gesture is a slide;
   the co-ordinates of the touch event are underneath the location of the text on the touch screen display;
   the given location is underneath the text; and
   the text style change is an underline of the text.

6. The method of claim 1, wherein the predefined gestures correspond to predefined text style changes and the predefined text style changes comprise underline, italicize, boldface, strikethrough, font size, case, orientation, highlighting, and paragraph alignment changes.

7. The method of claim 1, further comprising:
   identifying the number of pointers that initiate the gesture; and
   applying a first text style change to the text based on the identified number of pointers that initiate the gesture.

8. A system comprising:
   at least one processor; and
   at least one non-transitory computer readable storage medium storing instructions that, when executed by the at least one processor, cause the system to:
   select a subset of touch events from a plurality of available touch events to receive from an operating system;
   register an application having a text editing function with the operating system such that the application having the text editing function receives the subset of touch events from the plurality of available touch events from the operating system;
   receive from the operating system an indication of a touch event from the subset of touch events with regard to text displayed on a touch screen display, the indication comprising co-ordinates of the touch event, a number of pointers, and an action code;
   upon receipt of the indication of the touch event from the subset of touch events made with regard to text displayed on the touch screen display, determine, by the application based on the co-ordinates of the touch event, the number of pointers, and the action code, a gesture of a plurality of predefined gestures made with regard to the text displayed on the touch screen display by comparing the co-ordinates of the touch event to a location of the text on the touch screen display;

identify a text style change mapped to the determined gesture; and apply the text style change to at least a portion of the text displayed on the touch screen display.

9. The system of claim 8, further comprising instructions that when, executed by the at least one processor, cause the system to map a unique predefined combination of a total number of items that initiate a given touch event and a given location of the given touch event relative to preselected text to each text style change.

10. The system of claim 9, further comprising instructions that when, executed by the at least one processor, cause the system to determine the gesture of the plurality of predefined gestures made with regard to the text displayed on the touch screen display by comparing the co-ordinates of the touch event to the location of the text on the touch screen display and the given location of the given touch event relative to the preselected text.

11. The system of claim 10, wherein:
the text style change mapped to the determined gesture is a first text style change when the location of the touch event relative to preselected text on the touch screen display is in a first position; and
the text style change mapped to the determined gesture is a second text style change when the location of the touch event relative to preselected text on the touch screen display is in a second position.

12. The system of claim 11, wherein:
the first position is over the preselected text and the first text style change is a strikethrough; and
the second position is under the preselected text and the second text style change is an underline.

13. The system of claim 8, wherein:
the text style change mapped to the determined gesture is one of an underline or a strikethrough when the number of pointers is one; and
the text style change mapped to the determined gesture is one of text alignment, a font size change, or text rotation when the number of pointers is greater than one.

14. A non-transitory computer readable medium storing instructions thereon that, when executed by at least one processor, cause a computer system to:
select, by at least one processor, a subset of touch events from a plurality of available touch events to receive from an operating system;
register an application having a text editing function with the operating system such that the application having the text editing function receives only the subset of touch events from the plurality of available touch events from the operating system;
map a unique predefined combination of a total number of items that initiate a given touch event and a given location of the given touch event relative to preselected text to each text style change;
receive from the operating system an indication of a touch event from the subset of touch events with regard to text displayed on a touch screen display, the indication comprising co-ordinates of the touch event, a number of pointers, and an action code;
upon receipt of the indication of the touch event from the subset of touch events made with regard to selected text displayed on the touch screen display, determine, by the application based on co-ordinates of the touch event, the number of pointers, and the action code, a gesture of a plurality of predefined gestures made with regard to the selected text displayed on the touch screen display by comparing the co-ordinates of the touch event to a location of the selected text displayed on the touch screen display and the given location of the given touch event relative to the preselected text;
identify a text style change mapped to the determined gesture; and
apply the text style change to at least a portion of the selected text displayed on the touch screen display.

15. The non-transitory computer readable medium of claim 14, wherein the text style change comprises a font size alteration and the touch event corresponds to a gesture comprising touching a left point and a right point of the selected text and moving the touch points at least one of horizontally away from each other in order to increase font size or horizontally toward one another in order to decrease font size.

16. The non-transitory computer readable medium of claim 14, wherein the text style change comprises an orientation change and the touch event corresponds to a gesture comprising touching a top left point and a bottom right point on the selected text and moving the touch points at least one of clockwise or counter-clockwise in order to apply the text style change.

17. The non-transitory computer readable medium of claim 14, wherein the text style change comprises a change of paragraph alignment and the touch event corresponds to a gesture comprising touching two points in a body of the selected text and moving the touch points at least one of horizontally left in order to apply left-justified alignment, horizontally right in order to apply right-justified alignment, horizontally away from one another in order to apply fully justified alignment, or horizontally toward one another in order to apply centered alignment.

18. The non-transitory computer readable medium of claim 14, wherein the text style change comprises a change of text to strikethrough and the touch event corresponds to a gesture comprising touching a left point of the selected text and moving the touch point across the selected text.

19. The non-transitory computer readable medium of claim 14, wherein the text style change comprises a change of text to strikethrough or underline and the touch event corresponds to a gesture comprising touching a left point of the selected text and moving the touch point horizontally below the selected text.

20. The non-transitory computer readable medium of claim 14, wherein the text style change comprises a change of text to italics and the touch event corresponds to a gesture comprising touching a bottom left point of the selected text and a top right point of the selected text and moving the touch points horizontally away from one another in order to apply the text style change.

* * * * *